(12) United States Patent
DeCaluwe et al.

(10) Patent No.: US 7,106,691 B1
(45) Date of Patent: Sep. 12, 2006

(54) METHOD FOR TRACKING SOURCE AND DESTINATION INTERNET PROTOCOL DATA

(75) Inventors: Craig L. DeCaluwe, Naperville, IL (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 657 days.

(21) Appl. No.: 09/703,699

(22) Filed: Nov. 1, 2000

(51) Int. Cl.
*H04J 1/16* (2006.01)
*H04J 3/14* (2006.01)
*H04L 12/28* (2006.01)

(52) U.S. Cl. ............... 370/229; 370/235; 370/389; 370/412; 370/428

(58) Field of Classification Search ........ 370/230, 370/232, 235, 229, 389, 392, 396, 401, 412–413
See application file for complete search history.

(56) References Cited

U.S. PATENT DOCUMENTS

| | | | |
|---|---|---|---|
| 5,491,801 A * | 2/1996 | Jain et al. ............... 709/241 |
| 5,706,279 A * | 1/1998 | Teraslinna ................ 370/232 |
| 5,835,710 A * | 11/1998 | Nagami et al. ........... 709/250 |
| 6,189,035 B1 * | 2/2001 | Lockhart et al. ......... 709/229 |
| 6,205,155 B1 * | 3/2001 | Parrella et al. .......... 370/462 |
| 6,549,516 B1 * | 4/2003 | Albert et al. ............ 370/236 |
| 6,707,817 B1 * | 3/2004 | Kadambi et al. ......... 370/390 |
| 6,754,715 B1 * | 6/2004 | Cannon et al. .......... 709/231 |
| 2002/0131366 A1* | 9/2002 | Sharp et al. ............. 370/235 |

* cited by examiner

*Primary Examiner*—Seema S. Rao
*Assistant Examiner*—Robert C. Scheibel, Jr.
(74) *Attorney, Agent, or Firm*—Michael Haynes PLC; Michael N. Haynes; Dale R. Jensen

(57) ABSTRACT

In an IP network, tabulating the number of data packets received from and/or sent to a particular IP address over time can provide a mechanism by which it is possible to determine or predict overloading of a node or nodes in an IP data network. By selectively deleting data packets received from a suspect source address or inhibiting the transmission of data packets to a suspect destination address, network management and control can be readily accomplished.

20 Claims, 2 Drawing Sheets

METHOD FOR TRACKING SOURCE AND DESTINATION INTERNET PROTOCOL DATA

FIELD OF THE INVENTION

This invention relates to data networks. In particular this invention relates to a method and an apparatus for managing data flow in an Internet Protocol (IP) network so as to prevent network disruption caused by excessive data flow through one or more switches.

BACKGROUND OF THE INVENTION

FIG. 1 depicts a simplified block diagram of a simplified IP data network 100 of the prior art. The IP network 100 allows IP data to be sent between network users 120 and 122. A network of IP routers 102, 104, 106, and 108 (the purpose, function and operation of which are well known in the art) are interconnected by several data paths 110, 112, 114, 116, and 118 such that data from a particular customer 120 can be routed to/from other internet protocol data network customer 122 using any pathway through the network 100 such as coaxial cable, fiber optic cable, microwave data or other appropriate links between the routers.

As an example of a pathway through the network, data from a customer 120 might be received at a first router 108 and routed over a data path 118 to another router 102 which routes the traffic over the pathway 110 to the other router 104 connected to the destination address, customer 122. Alternate pathways through the network 100 might route data from router 108 through router 102 to router 106 and then to router 104. Yet another pathway might exist from router 108 to 106 to 104.

A problem with an IP data network, such as the simplified depiction in FIG. 1, is that one or more individual routers or internet protocol data switches can become overloaded by the transmission of data to a particular destination address or the receipt of too much data from a particular source address. Curtailing or limiting data to or through a router might limit the economic losses caused by data that is lost because a router is overloaded.

It is well known that IP data packets include both source and destination addresses, which are numerical indicators of the computer of the network from which the data originated and to which a packet is to be sent. In an internet protocol data system, misdelivered or discarded data packets that are not received by the destination are retransmitted by the source at the request of the destination when expected data packets, identified by other data transmitted with each packet, do not arrive.

Another problem with prior art internet protocol data switching networks is the inability to manage or control the flow of data from a particular source address or to a destination address in order to avoid overloading one or more routers in a network so as to insure the smooth flow of data packets through the overall network. A method and apparatus by which an internet protocol data network can manage the receipt of data from or to an address location would be an improvement over the prior art.

SUMMARY OF THE INVENTION

In an IP data network, source and destination IP addresses are recorded in memory in a router. The data on source and destination addresses of the data packets passing through the router are read through a user interface, or alternatively by a computer, to tabulate the amount of data from and to individual IP source and destination addresses.

When the data traffic from or to a particular IP address exceeds a predetermined threshold rate, the router can be controlled to discard messages either from a particular IP address or to a particular IP address via a user interface.

DETAILED DESCRIPTION OF THE PREFERRED EMBODIMENT

Figure 2:
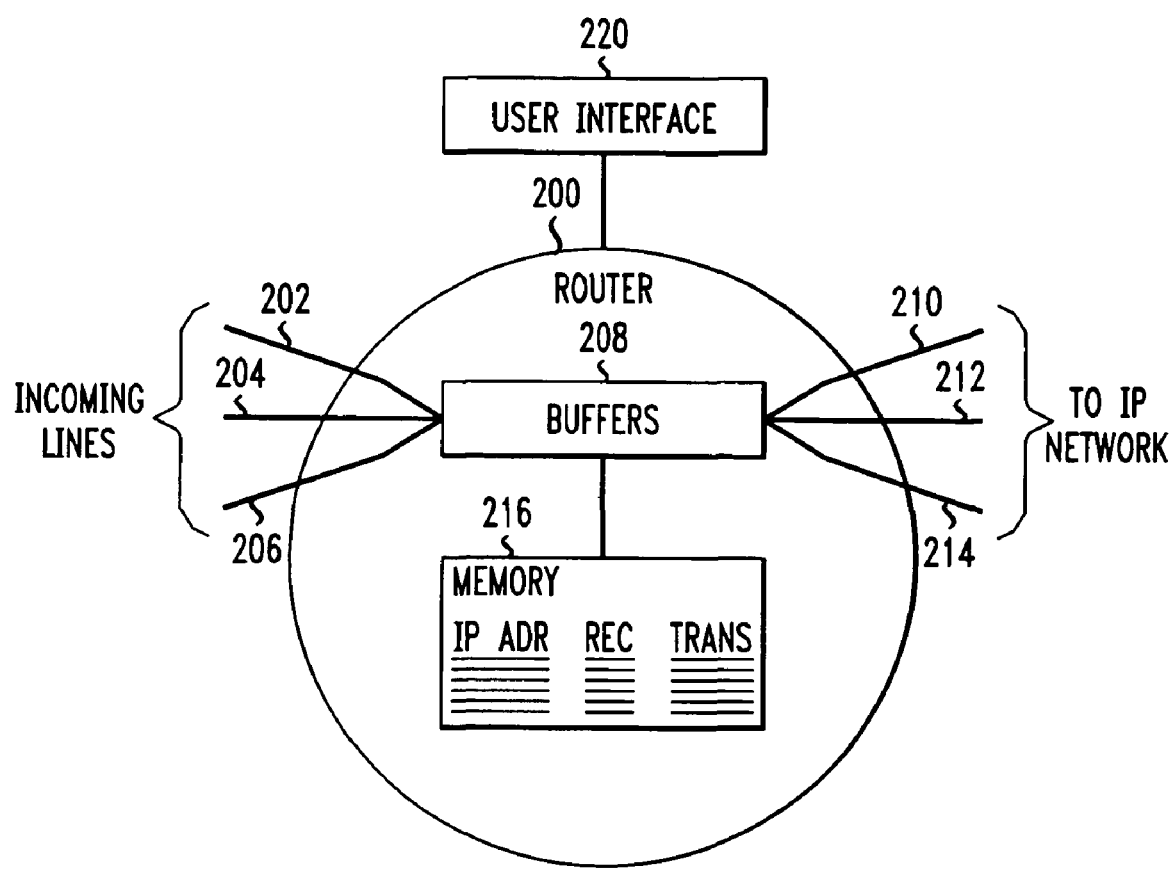
FIG. 2 shows a simplified block diagram of an exemplary router device with incoming data lines, outgoing data lines and buffer and memory devices by which source and destination IP addresses are tracked and recorded.

FIG. 2 shows a simplified block diagram of an improved internet protocol router 200. Incoming data lines 202, 204, and 206 carry internet protocol data packets, not shown, into the router 200; outgoing data lines 210, 212, 214 carry internet protocol (IP) data packets out of the router 200.

As is well known to those skilled in the art, IP data packets resemble Ethernet data packets in that each includes an address known as a source address that identifies a computer from which the data packet was originated. Each IP data packet also includes a destination address, which uniquely identifies the destination or end point to which the data packet is to be routed and delivered.

In FIG. 2, incoming data packets, i.e., data packets arriving on incoming lines 202, 204, or 206, are received at one or more data buffers 208 within the router 200. The data buffers 208 are typically comprised of random access memory (RAM) or equivalent (perhaps an appropriate fast disk drive) and provide an elastic storage for the data packets in the router device 200 that are eventually transmitted on outbound data lines 210, 212, and 214 to other points in the IP network.

While IP data packets are resident in the buffer 208 of the router 200, the source and destination IP addresses within each data packet are copied into or stored into a memory device 216, which acts to accumulate a record of the data traffic through the router 200 over a finite period of time. By using the accumulated data in the memory device 216, a processor, either within the router 200 or outside the router via a user interface 220, tabulates or counts the occurrence of either or both the source addresses and destination addresses of data packets passing through the router 200.

Figure 1:
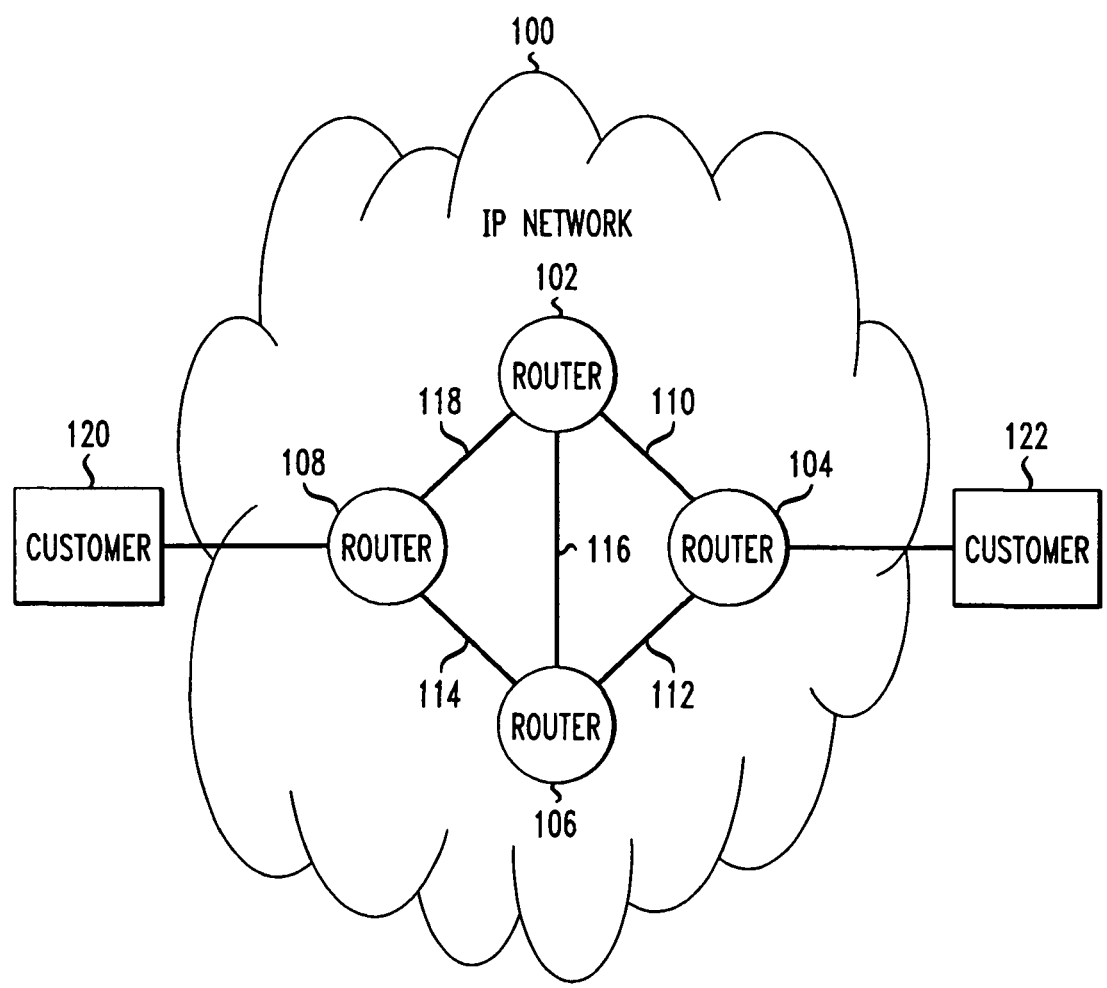
FIG. 1 shows a simplified block diagram of a prior art internet protocol data network.

By counting the occurrences of source addresses and/or destination addresses carried through the router 200 over a predetermined time interval, the length of which is a design choice, it is possible to measure the amount of traffic to and/or from a particular IP address so as to prevent data from a particular router, such as the routers 102, 104, 106 or 108 in FIG. 1, from overloading another router in the network.

By way of example, so-called computer hackers, intent on frustrating a computer network, might cause massive amounts of spurious data to be generated to or from one or more other routers in the network. Large numbers of data transmission from one switch (or source address) to another switch (or destination address) might be attributable to many causes. (In most instances, hackers cause many switches to send data to one switch to drive it into overload.) By tracking the data origins and destinations by source and destination addresses, it is possible to prevent such acts from crippling an entire data network if overruns (sometimes referred to as storms of data or data storms) of data are discarded or suppressed.

In FIG. 2, a user interface 220, which provides access to the data stored in memory 216, allows the accumulated tally of source addresses and destination addresses to be manually read. If the count of source and destination addresses per unit time exceeds some predetermined threshold, commands entered by the user interface 220 configure the router 200 to ignore IP data packets from, or to, the problematic address.

In an alternate embodiment, data traffic volume to or from a particular source address is monitored automatically. In the unlikely event that the source switching system were to be overloaded by an overwhelming amount of data for a destination address, an intervening router can inhibit the over-loaded switch from bringing a network down by overloading one or more of the intermediate nodes of the network.

In the preferred embodiment, a running count (or tabulation) of data packets received from a source address or to be sent to a destination address can be entered via the user interface 220 to the router itself 200. Alternate embodiments would certainly include substituting a computer manager for the user interface 220 such that the computer manager 220 would automatically poll the memory 216 over time to monitor the rate at which packets are flowing through the router. In the event the data from a particular address or to another address exceeded some manually or automatically determined threshold, both of which could be determined either empirically or heuristically, network congestion might be avoided by manually or automatically suppressing the reception of additional data packets from a particular source or discarding data packets accordingly. For purposes of claim construction, the manual and automatic determination of a threshold at which packets might be suppressed or discarded are considered to be equivalent. Similarly, the manual and automatic suppression of packets is considered to be equivalent.

The action of discarding a data packet can be accomplished simply by ignoring incoming data packets from a source address. Alternative methods would include overriding previously stored data packets in a buffer with newly received data packets such that the end result is that the total volume of data packets from a source does not exceed some predetermined allowable threshold. One or more messages might be sent from one router to another, instructing the other switch to discard packets from a particular source. A variant of such an embodiment would include sending such an alarm message throughout the network so that all switches connected therein would discard problematic data. As for the inhibition of packet transmission, an overwhelmingly large number of data packets addressed to a destination can be controlled simply by deleting or overriding outbound packets with new or other information.

By monitoring the source address data and the destination address data in an IP protocol network, data overflow on a network might be avoided. By automating the monitoring and maintenance of data traffic through the network, overall system reliability can be increased.

We claim:

1. In an Internet Protocol (IP) data network comprised of a plurality of interconnected routers, a method comprised of:
    receiving at a first router a plurality of IP data packets, the first router directly interconnected by a first plurality of data paths to a first sub-plurality of interconnected routers from the plurality of interconnected routers;
    tabulating at said first router a plurality of source counts of IP data packets, each source count of IP data packets of said plurality of source counts of IP data packets indicative of a count of packets received from a particular IP source during a first time interval, said plurality of source counts of IP data packets associated with every source that provides IP data packets to said first router;
    tabulating at said first router a plurality of destination counts of IP data packets, each destination count of IP data packets of said plurality of destination counts of IP data packets indicative of a count of packets routable to a particular IP destination address during said first time interval;
    storing each of said plurality of source counts and each of said plurality of destination counts in a memory device for subsequent processing;
    determining that a time-based data traffic measure exceeds a predetermined threshold, said time based traffic measure based upon a particular source count of said plurality of source counts; and
    responsive to said determining step, sending a message to a second router, said message adapted to instruct said second router to discard packets associated with said time-based traffic measure, wherein said second router is not a source router for said packets, the second router directly interconnected by a second plurality of data paths to a second sub-plurality of interconnected routers from the plurality of interconnected routers.

2. The method of claim 1 further including the steps of:
    reading said time-based traffic data measure from said memory device; and
    selectively discarding IP data packets received at said first router responsive to said determining step.

3. The method of claim 1 wherein said first router is an IP data router switching system.

4. The method of claim 2 wherein said step of selectively discarding IP data packets includes the step of denying reception of IP data packets from a particular router based upon a source address in IP data packets based upon said determining step.

5. In an Internet Protocol (IP) data network comprised of a plurality of interconnected routers, a method comprised of:
    receiving a plurality of IP data packets at a first router, the first router directly interconnected by a first plurality of data paths to a first sub-plurality of interconnected routers from the plurality of interconnected routers;
    tabulating at said first router a plurality of source counts of IP data packets, each source count of IP data packets of said plurality of source counts of IP data packets indicative of a count of packets received from a particular IP source during a first time interval, said plurality of source counts of IP data packets associated with every source that provides IP data packets to said first router;
    tabulating at said first router a plurality of destination counts of IP data packets, each destination count of IP data packets of said plurality of destination counts of IP data packets indicative of a count of packets routable to a particular IP destination address during said first time interval;
    storing each of said plurality of source counts and each of said plurality of destination counts in a memory device for subsequent processing;
    determining that a time-based data traffic measure exceeds a predetermined threshold, said time based traffic measure based upon a particular destination count of said plurality of destination counts; and responsive to said determining step, sending a message to a second router, said message adapted to instruct said second router to discard packets associated with said time-based traffic measure, wherein said second router is not a source system for said packets, the second router directly interconnected by a second plurality of data paths to a second sub-plurality of interconnected routers from the plurality of interconnected routers.

6. The method of claim 5 further including the steps of:

reading said time-based traffic data measure from said memory device;

selectively inhibiting a transmission of IP data packets from said first router responsive to said determining step.

7. The method of claim 5 wherein at least one of said first router and said second router is an IP data router switching system.

8. The method of claim 6 wherein said step of selectively inhibiting the transmission of IP data packets includes the step of sending a message to a specific router to discard messages either received from or sent to a specific IP address, the specific router not a source for said messages.

9. A method comprising:

in an Internet Protocol (IP) data network that comprises a plurality of interconnected routers at a first router, determining that a time-based data traffic measure from a particular IP source exceeds a predetermined threshold, the first router directly interconnected by a first plurality of data paths to a first sub-plurality of interconnected routers from the plurality of interconnected routers, the time-based data traffic measure based upon at least one of a source count of a plurality of source counts or a destination count of a plurality of destination counts, each source count of IP data packets of said plurality of source counts of IP data packets indicative of a count of packets received from a particular IP source during a first time interval, each destination count of IP data packets of said plurality of destination counts of IP data packets indicative of a count of packets routable to a particular IP destination address during said first time interval, each of said plurality of source counts and said plurality of destination counts tabulated and stored at the first router, said plurality of source counts of IP data packets associated with every source that provides IP data packets to said first router; and responsive to said determining step, sending a message to a second router, said message adapted to instruct said second router to discard packets from said particular IP source, wherein said second router is not a source router for said packets, the second router directly interconnected by a second plurality of data paths to a second sub-plurality of interconnected routers from the plurality of interconnected routers.

10. The method of claim 9, further comprising:
overwriting packets in a buffer responsive to said determining step.

11. The method of claim 9, further comprising:
providing said time-based data traffic measure to a user via a user interface.

12. The method of claim 9, further comprising:
sending said message to a sub-plurality of routers.

13. The method of claim 9, further comprising:
ignoring incoming packets from said particular IP source.

14. The method of claim 9, further comprising:
determining said predetermined threshold.

15. The method of claim 9, further comprising:
automatically polling a memory for information indicative of said time-based data traffic measure.

16. The method of claim 5, further comprising:
overwriting packets in a buffer responsive to said determining step.

17. The method of claim 5, further comprising:
providing said data traffic measure to a user via a user interface.

18. The method of claim 5, further comprising:
sending said message to a sub-plurality of routers.

19. The method of claim 5, further comprising:
ignoring incoming packets to said particular IP destination.

20. The method of claim 5, further comprising:
determining said predetermined threshold.

* * * * *